May 21, 1929. F. MEYER 1,713,854
ARTICLE OF GLASS AND METHOD FOR PRODUCING THE SAME
Filed Aug. 26, 1926
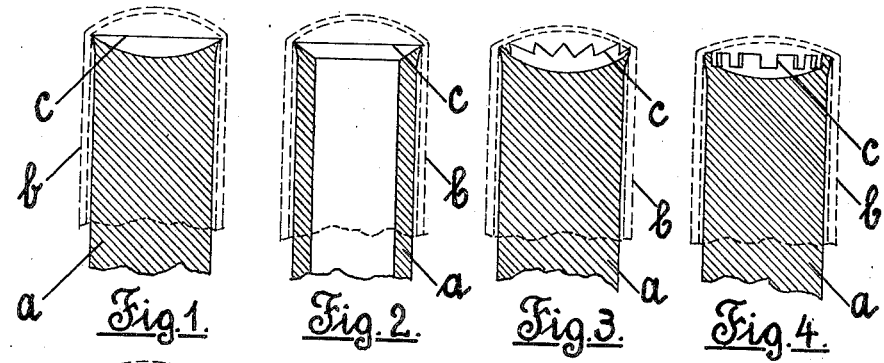
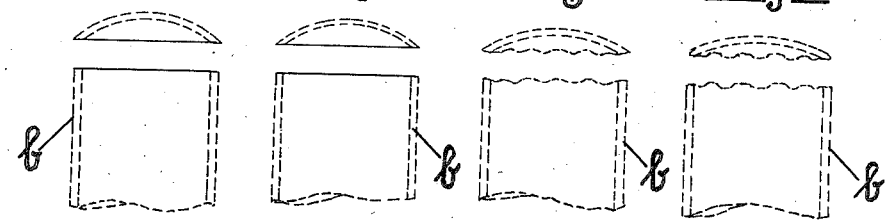
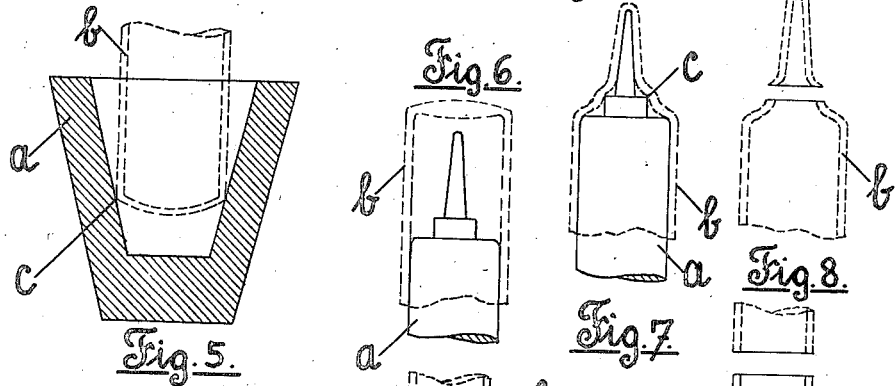
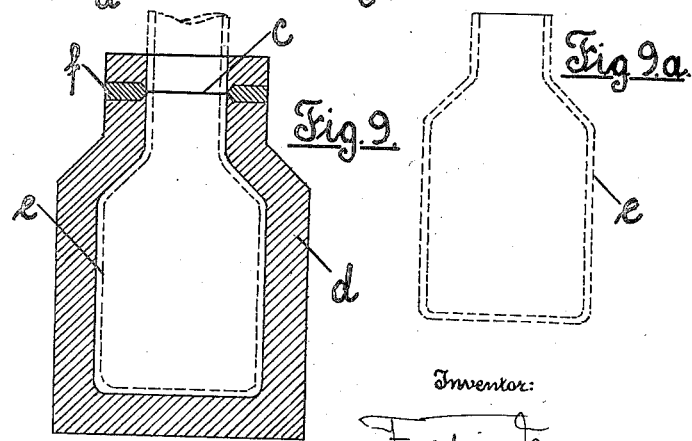

Patented May 21, 1929.

1,713,854

UNITED STATES PATENT OFFICE.

FELIX MEYER, OF AIX-LA-CHAPELLE, GERMANY.

ARTICLE OF GLASS AND METHOD FOR PRODUCING THE SAME.

Application filed August 26, 1926, Serial No. 131,790, and in Germany March 29, 1926.

My invention relates to new improvements in articles, made of hollow or solid glass, especially such as plates, panes, tubes and containers, for instance bottles, flasks, jars, vials and the like, and concerns also the necessary methods and devices for producing such improvements.

The object of my invention is, to impart to such articles of glass and the like the physical property, to become divided into two or more parts by means of a split or crack, not unvoluntarily, but only at will, at any suitable time, at a certain place, in a predetermined manner and without splintering, without the application of heat or cold or the use of tools, like lining knives or diamonds, but simply by slightly injuring the surface of the article at one or several points, the purpose of such splitting or dividing being for instance the opening of such containers, the forming of specially shaped ends of tubes, the cutting of a special form out of a glass plate or any other purposes.

According to my invention the above described special feature of such articles, namely the disposition to split or divide without creating splinters, at a certain place, in a certain form and at a slight injury of the skin of the glass, is attained by setting up at a certain place a local permanent tension of such form, course and intensity, that this tension will not suffice to crack the glass at once or at an unintentional time, for instance at a sudden change of temperature, but only when this crack is intentionally and wilfully caused by slightly injuring the skin or surface of the glass at any point of the part where the tension has been set up, such injuring being effected for instance by slightly touching or scratching such a point with a harder substance especially emery paper and the like.

According to the invention the form of tension set up in such articles is that of a narrow, endless line, leading round the end of the part, which is to be separated from the rest of the article. This line of tension can be straight, undulatory, zigzag or of any other form. It can be one continuous line or a number of small lines following the course of a main line, broken by intervals which have no tension or a tension of smaller intensity.

This tension can be set up in different ways, but in all cases it requires a change in the molecular condition or structure at that part of the glass and always is the result of a more or less sudden local addition or subtraction of heat. To provide the article with such tension, either the cold glass is heated locally by means of stiff flames, heated wires or tools, or the hot glass is cooled locally by means of a cold tool, cold air or cold liquid.

It obviously requires some skill and experience to produce a tension of such efficiency, that it will only work when desired and not crack the glass prematurely. This efficiency depends on the composition, mass and temperature of the glass, the amount of heat or cold added or withdrawn, the form of the line of tension and many more instances. The efficiency of this tension can for instance be influenced by the conductivity of the tool, also by the length of the line of tension and most effectively by the length and frequency of the interruptions of this line. Although special knowledge is necessary, to carry out my invention I have, as shown, many means and combinations, to obtain the right efficiency of the tension, and it will depend on the article and the mode of manufacturing it, which of the different ways of setting up the line of tension is to be preferred.

In some cases the tension will be produced after the article has been formed, in other cases the setting up of the tension will go along with the shaping of the article and in other cases part of the forming will go with the setting up of the tension, while the article is finished in the ordinary way. If the article is made by pressing or blowing a lump of hot glass in a mould or form, the tension can be set up in the mould, by giving part of it a higher conductive power than other parts. Or it can be taken out of the mould and while hot, brought into contact with a cold tool or mould. Or, if made in the ordinary way it can be reheated altogether or partly, for instance by means of stiff hot flames or by electrically heated wires and cooled more or less suddenly. If the article is made of a tube by finishing it in a flame, the tool can be brought into contact with the glass after it has been formed and while it is still hot, or the tool can at the same time give the glass the necessary shape, as well as the tension.

In order to give some special directions, to properly carry out this invention, a description of some special methods and devices for setting up the tension for instance in the case of a sealed container will be set forth and reference be made to the accompanying drawings.

All the drawings show a central vertical section. The Figures 1–5 show a view of tools, which serve to set up the line of tension in tubes or containers, the bottom of which are to be made afterwards. The Figures 1–4 show these tools being introduced into the tubes from inside. Fig. 5 shows a tool working from outside. (a) are the tools, (b) are the tubes or containers, (c) are the lines where the tools, coming into contact with the hot glass, set up the line of tension. The tool in Fig. 1 is a solid body, the top of which is slightly concave, in order to give the edge of the tool a narrow line of contact. The tool in Fig. 2 is a tube, the top part of which is flared out to avoid a contact with that part of the glass tube, which is not to be influenced by the cold tool. Fig. 3 shows a tool, the top of which is serrated in order to produce an interrupted line of tension, consisting of small points of tension. Fig. 4 shows a similar tool, causing a broken line of tension, composed of short lines, following the main line. In all these figures the dotted lines represent the tubes. In Figs. 1ª, 2ª, 3ª, 4ª only these tubes are shown in a divided state i. e. when the top has been cracked and taken off. The different shapes of the edges, caused by the different shapes of the tools and by the differently formed lines of tension are visible. Fig. 5 shows a tool (a) with an inside cone, touching the outside of the glass at the line, where the cylindrical part of the sealed tube or container meets the cone, when being introduced into the tool. Fig. 5ª shows the top of the tube or container, after being separated from its body. Fig. 6 shows a tube with a tool partly introduced, while Fig. 7 shows the same tool fully introduced, after having drawn out the softened sealed top of the tube, so as to form it into a long sealed neck, producing the line of tension, where line (c) touches the hot glass, while it is being drawn out. Fig. 8 shows this tube after the top has been taken off at the line of tension. Fig. 9 shows a mould (d) with a hot container (e) introduced, the part (f) of this mould consisting of a material of high conductivity, while the rest is of a material less conductive, the part (f) setting up the line of tension (c). Fig. 9ª shows the bottle divided into two parts.

In all cases the tools can be of metal or of a material with less conductivity, for instance carbon, soapstone or the like.

A container of such kind, as described before, may serve for many purposes and any contents. It is specially adaptable for liquids and solid substances for keeping them in a hermetically sealed vessel. It is used with great advantage for vials and flasks, which owing to their contents cannot be sealed by stoppers of any kind but glass and which must be opened without splintering in order to avoid such splinters falling in to the container thereby destroying the sterility of the contents and endangering the injection. It is therefore especially adaptable for storing medicines intended for injection. It is equally adaptable for contents like cigars, tobacco, vanilla, to preserve the flavour and the moistness thereof.

These are only a few examples of articles, methods and devices possible for carrying out my invention and I wish it to be understood that I do not restrict my invention to the illustrated and described examples and that any means may be employed to produce a line of tension of any form, grade and efficiency for the purpose set forth and any articles may be made having a line of tension for the purpose set forth and for any other purposes.

I claim as my invention:

1. A glass article of any desired shape having a line of strain therein of such strength, position and shape that, at any time, the article may be divided along such predetermined strain line without splintering solely by intentionally slightly injuring the surface of the glass at a point in substantial register with such strain line.

2. A glass article of any desired shape having a line of strain therein of such strength, position and shape that, at any time, the article may be divided along such predetermined strain line without splintering solely by intentionally slightly injuring the surface of the glass at any point in substantial register with such strain line.

3. The method of preparing a glass article for subsequent division along a predetermined line, comprising putting an internal strain in such article along the required division line of such strength that, at any time, the article may be divided along such line without splintering solely by intentionally slightly injuring the surface of the glass at a point in substantial register with said line.

4. The method of forming a hollow glass article for subsequent division along a predetermined line, comprising simultaneously shaping said article and putting an internal strain therein along the required division line of such character and strength that, at any time, the article may be divided along such predetermined line without splintering solely by intentionally slightly injuring the surface of the glass at a point in substantial register with such strain line.

5. The method of forming a hollow glass article from a heated hollow glass body and susceptible of subsequent division along a predetermined separation line, comprising simultaneously shaping said body internally into the desired form and deforming the glass thereof to provide an internal strain therein along the required division line of such character and strength that, at any time, the article may be divided along such predetermined strain line without splintering solely by intentionally slightly injuring the surface of the glass at a point in substantial register with such strain line.

In testimony whereof I affix my signature.

FELIX MEYER.